March 1, 1949.  F. A. RAMSDELL  2,463,311
APPARATUS FOR PROJECTING STEREOPICTURES
Filed Oct. 28, 1946

INVENTOR
FLOYD A. RAMSDELL
BY Owen W. Kennedy
ATTORNEY

Patented Mar. 1, 1949

2,463,311

UNITED STATES PATENT OFFICE 2,463,311

APPARATUS FOR PROJECTING STEREOPICTURES

Floyd A. Ramsdell, Worcester, Mass., assignor to Worcester Film Corporation, Worcester, Mass., a corporation of Massachusetts Application October 28, 1946, Serial No. 706,270

3 Claims. (Cl. 88—16.6)

The present invention relates to stereo photography and has for its object to provide improved apparatus for projecting pictures which create, upon observation, a three-dimensional or stereoscopic effect, when such projection and viewing is accompanied by the use of suitable light polarizing means.

In my Patent No. 2,329,294 issued September 14, 1943, there is shown and described an attachment which is adapted to be mounted in front of the single objective lens of a projector for simultaneously projecting stereoscopically related images existing in side-by-side relation on a film into overlying relation on a screen to create a three-dimensional effect when observed. While the attachment of the above noted patent is entirely satisfactory for creating a three-dimensional effect with the projected film images, the use of a single lens projector presents certain difficulties due to the tendency of ghost images to appear on either side of the center of the screen where the film images are projected in overlying relation.

According to the present invention, the difficulties arising from ghost images is entirely eliminated by substituting for the single lens of a projector a multiple lens so constructed as to transmit the film images independently of each other and project them in overlying relation on a screen, with separate elements of the lens system being relatively adjustable to create the desired three-dimensional effect for screens of different areas located at different distances from the projector.

The above and other advantageous features of the invention will hereinafter more fully appear from the following description considered in connection with the accompanying drawings in which.

Figure 1:
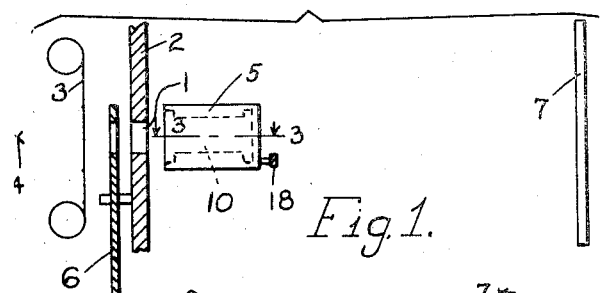
Fig. 1 is a diagrammatic view of apparatus embodying the invention, as applied to a projector.

Referring first to Fig. 1, the invention is shown as being applied to a motion picture projector of usual construction, only the essential parts of which are shown. The projector provides a film gate 1 in an aperture plate 2 and the usual mechanism is provided for feeding a film 3 past the gate between the plate 2 and a light source 4. A lens casing 5 is mounted between the plate 2 and a shutter 6 that is connected to the mechanism for feeding the film so as to project film images on a screen 7 in the manner hereinafter described.

Figure 2:
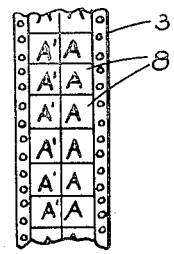
Fig. 2 illustrates the appearance of a section of film with pairs of stereoscopically related film images thereon.

A portion of the film 3 is shown in Fig. 2 as being of the type usually employed in connection with any motion picture projectors. The film 3 provides a series of frames 8 and each frame provides a pair of stereoscopically related images A and A' that have been simultaneously produced in side-by-side relation on the film 3 by means of any suitable camera and an attachment for making stereo pictures, such as is shown, for example, in my aforesaid Patent No. 2,329,294.

Generally speaking, the film images A and A' on each stereoscopic pair record what would be seen by an observer viewing the subject being photographed through first one eye and then the other. Therefore, when the two images A and A' of each pair are simultaneously projected through light polarizers in overlying relation on a screen a three-dimensional effect is obtained by an observer viewing the projected images through similar light polarizers.

As previously pointed out, the object of the present invention is to provide an improved arrangement for projecting each pair of stereoscopic related images A and A' on the film 3 in overlying relation on the screen 7 by means of a multiple lens that may be mounted in the lens casing 5 of the projector in place of the usual single lens, with this lens system being adjustable to closely control the degree of registration between the projected film images on the screen 7. One form of such an improved lens system is shown in Fig. 3 which is a horizontal sectional view along the line 3—3 of the Fig. 1 showing the parts on an enlarged scale.

Figure 3:
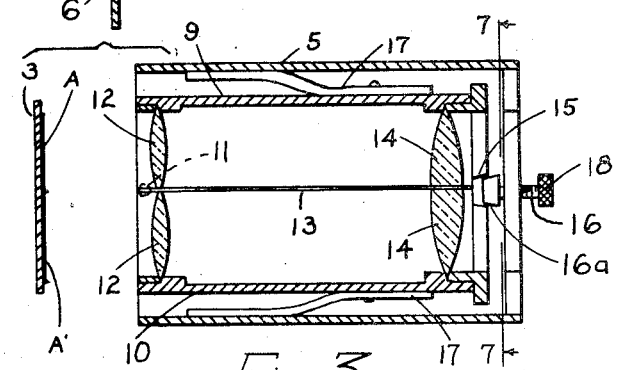
Fig. 3 is a horizontal sectional view along 3—3 of Fig. 1 showing the construction of the lens system of the projector on an enlarged scale.
Figure 5:
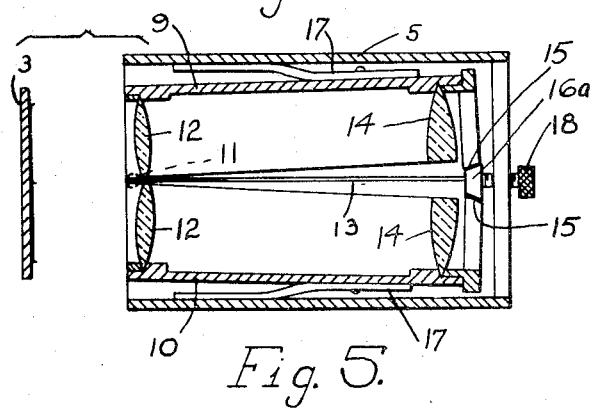
Fig. 5 is a view similar to Fig. 3 showing the lens system of the projector with a different adjustment.
Figure 8:
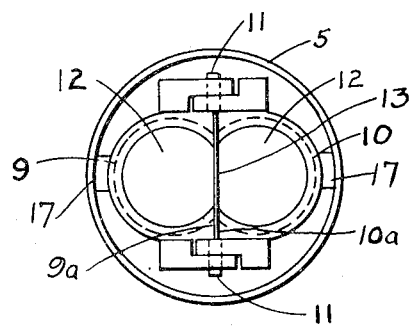
Fig. 8 is a detail view showing an arrangement for pivoting the lens system, as viewed from the film end.

Referring now to Fig. 3, the lens system consists of a pair of tubes 9 and 10 that extend longitudinally within the casing 5 of the projector and are mounted to turn on a common pivot 11 at the end of the casing 5 nearest to the film gate 1, see Fig. 8. The tubes 9 and 10 are cut away along one side to provide flat faces 9a and 10a which extend opposite to each other within the casing 5. The tubes 9 and 10 may be turned on their pivot 11 to vary the angular relation between the faces 9a and 10a, as shown in Figs. 3 and 5.

Each tube 9 and 10 provides a lens 12 of substantially circular form at the end of the tube nearest the gate 1 and it will be noted that the optical axis of the lens 12 in the tube 9 coincides with the center of film image A, while the optical axis of the lens 12 in the tube 10 coincides with the center of the film image A'. Therefore, each lens 12 is adapted to transmit the particular film image on one half of each film frame 8, as the frames are successively presented to the gate by the film feeding mechanism of the projector. A shield 13 extends between the open sides of the tubes 9 and 10 at right angles to the plate 2 to prevent interference between the light rays from each film image before and after passing through the lenses 12.

Figure 7:
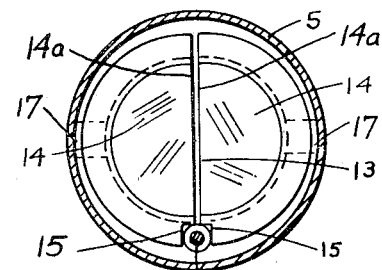
Fig. 7 is a vertical sectional view along the line 7—7 of Fig. 3, looking in the direction of the arrows.

Each lens tube 9 and 10 also provides a lens 14 at the end of the tube nearest the screen 7 and it will be seen from Fig. 7 that one side of each lens 14 is cut away at 14a to provide a flat face that is opposite to the flat face 14a of the other lens. Therefore, by turning the lens tubes 9 and 10 on their pivot 11, the flat lens faces 14a can be brought into substantial engagement as shown in Fig. 3, or can be slightly spaced as shown in Fig. 5, in order to control the degree to which the projected film images A and A' are caused to overlie each other and obtain the desired stereoscopic effect when viewed on the screen 7, in conjunction with suitable light polarizing devices, not shown, for projecting and viewing.

Referring now to Fig. 7, there is shown an arrangement whereby the lens tubes 9 and 10 may be turned in unison about their common pivot 11, so as to move the flat faces 14a of the lenses 14 toward or away from each other to the same degree. For this purpose, the outside ends of the tubes 9 and 10 are oppositely inclined at 15, on each side of the shield 13, and these faces 15 are yieldingly held in engagement with the wedge-shaped end 16a of a screw 16 by springs 17 between the casing 5 and the tubes 9 and 10. The screw 16 provides a knob 18 whereby it may be turned from beyond the end of the casing 5. Turning the knob 18 will cause the lens tubes 9 and 10 to swing in unison about the pivot 11 either toward or away from each other in order to positively control the degree of registration between the projected film images A and A'.

Figures 4, 6:
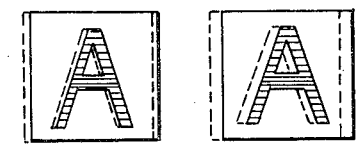
Fig. 4 illustrates the appearance of the projected film images on the screen, with the lens system having the adjustment shown in Fig. 3.
Fig. 6 illustrates the appearance of the projected film images on the screen, with the lens system having the adjustment shown in Fig. 5.

When a film 3 having a pair of double images in each frame 8, of the character shown in Fig. 2, is run through a projector provided with a lens system embodying my invention, double images will be thrown on the screen 7, the location of which is indicated diagrammatically in Fig. 1 without reference to any fixed location, since different distances between the projector and the screen can be compensated for through the adjustments of the lens system. For example, by manipulation of the knob 18 while observing the projected screen images, the lens tubes 9 and 10 can be swung in unison about their pivot 11, so as to cause the screen images to appear in only partial registration, as shown in Fig. 6, or to appear in substantially complete registration, as shown in Fig. 4. In other words, the degree of offset between the projected film images on the screen 7 will be in direct proportion to the degree of separation between the flat faces 14a of the lenses 14.

From the foregoing, it will be apparent that a projector provided with a lens system embodying my invention is capable of ready adjustment to meet varying conditions, as regards size of screen, the distance of any particular screen from the projector and the nature of the subject shown on the film. That is to say, the projector when once mounted with relation to a given screen, can be adjusted while observing the projected screen images to obtain just the right amount of registration between the screen images to give the desired three-dimensional effect. When once this relation has been established by the operator, the adjustment is maintained, although minor adjustments may be required for a given screen set-up due to the type of subject shown on the film, it being apparent that the three dimensional effect will vary between close-up and long-distance shots. Furthermore, the same projector when used in another location where the screen is at a greater or lesser distance than with the original set-up, can be quickly adjusted by turning the knob 18 to bring about the desired degree of registration between the projected film images in the new location. Generally speaking, the greater the distance between the projector and the screen, the smaller will be the distance between the lens faces 14a to obtain a given registration of screen images, with the distance between the lens faces increasing as the screen is moved nearer to the projector.

Figure 9:
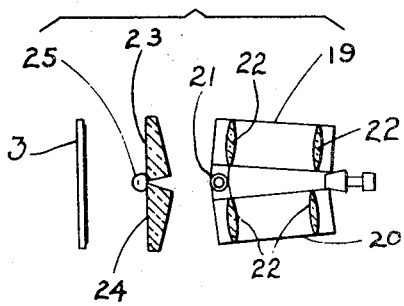
Fig. 9 is a view similar to Fig. 3 showing modification of the lens system.

Referring now to Fig. 9, there is shown a modification in the lens system of the projector to obtain substantially the same results, while using conventional lenses in the tubes 19 and 20. In the modified arrangement, the tubes 19 and 20 are mounted on a common pivot 21 as in Fig. 8, with the lenses 22 of each tube 19 or 20 being coaxial, it being noted however, that the tubes 19 and 20 are offset with respect to the pivot 21, so that the tubes may be inclined towards each other in the direction of the screen, as shown.

In order to transmit light rays from the film images A and A' into the offset ends of the lens tubes, a pair of optical wedges 23 and 24 are mounted on a common pivot 25. It is to be noted that the pivots 21 and 25 lie along the central axis of the projector and both tubes 19 and 20 and optical wedges 23 and 24 are adapted to be turned in unison in opposite directions by means of the same arrangement previously described with reference to Fig. 7, and in my aforesaid Patent No. 2,329,294.

With the modified arrangement of Fig. 9, light rays from the film images A and A' are transmitted into the offset ends of the tubes 19 and 20 and the tubes will in turn project the film images on the screen with a degree of registration determined by the angle between the tube axes. By reason of the double adjustment of the optical wedges and lens tubes about the pivots 21 and 25, it is possible to exercise a very close control over the projected screen images to obtain substantially the same results previously described with reference to Figs. 3 and 5.

While the invention has been described, for purposes of illustration, as being concerned with the projection of pairs of stereoscopically related film images, obviously my projector may be employed in connection with the showing of any type of picture, wherein it is desired to project one picture image upon another in overlying relation, as for example the image of a figure upon a background, with provision for adjusting the relation between the two images.

I claim:

1. Apparatus for projecting stereo pictures from a film in which each frame provides a pair of stereoscopically related film images, consisting of a pair of lens holders for independently transmitting the film images of each frame to a screen, with each holder providing a lens at the end nearest the film the optical axis of which substantially coincides with a film image and a second lens at the opposite end of each holder which is cut away to provide a flat face, said lens holders being movable about a common pivot adjacent the first named lenses to permit the cut away faces of the other lenses to be moved toward or away from each other.

2. Apparatus for projecting stereo pictures from a film in which each frame provides a pair of stereoscopically related film images, consisting of a pair of lens holders for independently transmitting the film images of each frame to a screen, with each holder providing a lens at the end nearest the film, the optical axis of which substantially coincides with a film image and a second lens at the opposite end of each holder which is cut away to provide a flat face, and means for moving said lens holders in unison about a common pivot located adjacent to the first named lenses to control the distance between the flat faces of the cut away lenses and thereby vary the degree to which the film images may be projected in overlying relation on a screen.

3. Apparatus for projecting stereo pictures from a film in which each frame provides a pair of stereoscopically related film images, consisting of a pair of lens holders for independently transmitting the film images of each frame to a screen, with each holder having a lens at the end nearest the film, the optical axis of which substantially coincides with a film image, and a second lens at the opposite end of each holder which is cut away to provide a flat face which is disposed adjacent to the corresponding flat face of its associated second lens, with the angular relation between the optical axes of the lenses in said holders being adjustable with respect to a common holder pivot located adjacent to the first named lenses to determine the degree to which the film images will be projected in overlying relation on a screen at a predetermined distance from said projecting apparatus.

FLOYD A. RAMSDELL.

REFERENCES CITED

The following references are of record in the file of this patent:

UNITED STATES PATENTS

| Number | Name | Date |
| --- | --- | --- |
| 1,291,954 | Losey | Jan. 21, 1919 |
| 1,325,314 | Blackman | Dec. 16, 1919 |
| 1,514,543 | Lane et al. | Nov. 4, 1924 |
| 1,859,021 | Burkhardt | May 17, 1932 |
| 2,004,442 | Kosken | June 11, 1935 |
| 2,145,437 | Thomas | Jan. 31, 1939 |
| 2,304,724 | Austin | Dec. 8, 1942 |